(12) United States Patent
Marino et al.

(10) Patent No.: US 7,002,327 B2
(45) Date of Patent: Feb. 21, 2006

(54) DIGITAL CONTROL APPARATUS FOR A SWITCHING DC-DC CONVERTER

(75) Inventors: Filippo Marino, Tremestieri Etneo (IT); Marco Minieri, Palermo (IT); Pietro Costanza, Palermo (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 35 days.

(21) Appl. No.: 10/676,816

(22) Filed: Sep. 30, 2003

(65) Prior Publication Data

US 2004/0104716 A1 Jun. 3, 2004

(30) Foreign Application Priority Data

Oct. 1, 2002 (EP) .................................. 02425595

(51) Int. Cl.
*G05F 1/40* (2006.01)

(52) U.S. Cl. ...................................... 323/283; 323/285

(58) Field of Classification Search ................ 323/283, 323/285, 284, 282

See application file for complete search history.

(56) References Cited

U.S. PATENT DOCUMENTS

| 5,594,631 | A | * | 1/1997 | Katoozi et al. ............... 363/41 |
| 5,705,920 | A | * | 1/1998 | Watanabe et al. ........... 323/285 |
| 6,005,377 | A | * | 12/1999 | Chen et al. .................. 323/283 |
| 6,356,063 | B1 | | 3/2002 | Brooks |
| 6,396,725 | B1 | | 5/2002 | Jacobs et al. |
| 6,795,009 | B1 | * | 9/2004 | Duffy et al. ................. 341/155 |

OTHER PUBLICATIONS

G. Capponi, et al., Modeling and Simulation of new digital control for power conversion,[th] Power Electronics Specialists Conference, 2002, pesc Feb. 2002 IEEE 33rd Annual, vol. 1, 2002, pp. 155-158.

European Search Report, Priority European Patent Application No. 02425595 May 20, 2003.

* cited by examiner

*Primary Examiner*—Shawn Riley
(74) *Attorney, Agent, or Firm*—Carol W. Burton, Esq.; William J. Kubida, Esq.; Hogan & Hartson L.L.P.

(57) ABSTRACT

A digital control apparatus for a switching DC-DC converter includes at least one power transistor and is able to provide a regulated output voltage on a load. The apparatus includes digital control having a reference digital input signal and provides a modulating signal to a PWM device to which is input the modulating signal and which provides an output square wave signal for driving the power transistor of the DC-DC converter such that there is non-linear modulation only when the value of a signal on the load is lower or higher than a prefixed value range.

20 Claims, 4 Drawing Sheets

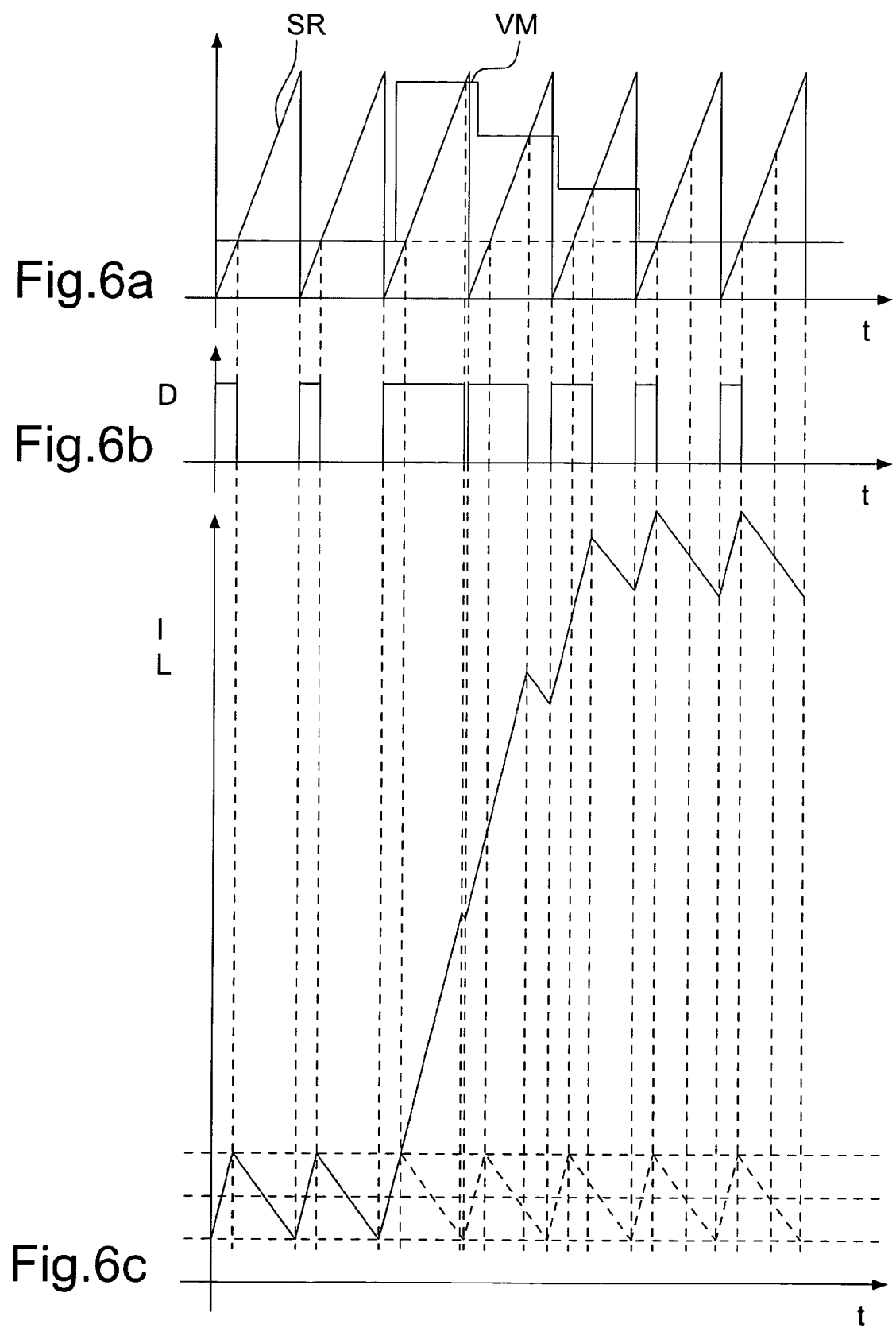

DIGITAL CONTROL APPARATUS FOR A SWITCHING DC-DC CONVERTER

FIELD OF THE INVENTION

The present invention refers to a digital control apparatus for a switching DC-DC converter.

BACKGROUND OF THE INVENTION

There is presently a continuous evolution of computers and above all of microprocessors. The need to process an always greater quantity of information in the shortest possible time has brought to manufacture high performance microprocessors that require high currents (which have a value of tens of amperes) for operation thereof. For this reason devices able to provide a low supply voltage and a high current have been manufactured.

However, the present microprocessors do not require high currents in continuous way but only in prefixed time periods; this is due to the quantity of operations that must be performed in said time periods. Therefore the value of the current adsorbed from them must change from tens of milliamperes to 80–100 amperes in a short time (a few nanoseconds).

Said devices are power supplies comprising switching DC-DC converters as, for example, the step-down converter shown in FIG. 1. Said converter comprises a MOS power transistor M having a non-drivable terminal connected with an inductor L that in turn is connected with a real capacitor constituted by a capacitor Cr and a resistor R and which is placed in parallel with a load LOAD, for example a microprocessor. When the load LOAD has an abrupt variation, the average current that flows through the inductor cannot rise quickly to the value required by the load LOAD and the capacitor is discharged. The waveform of the output voltage Vout, which is shown in FIG. 2a, will have a negative and positive voltage variation, respectively, at the start and at the end of the time period wherein a high current value is required by the load LOAD. If the variation of the current Iload (FIG. 2b) on the load is given by ΔI, the instantaneous voltage variation will be, in first approximation, $\Delta V = \Delta I \ast R$.

The switching DC-DC converters are provided with control devices normally placed between the output and the driving terminal of the power transistor of said converters. The most utilized control devices are of the analog type but control devices of the digital type are presently being affirmed which present numerous advantages with respect to the analog control devices. In fact they are less sensitive to environmental variations, are less sensitive to noise, have less sensitivity to parameter variations and also the change of the control device does not require the change of its components. The last feature allows them to have a higher flexibility with respect to control devices of the analog type because it is not necessary to change the electric components of the control device for conforming to different circuit applications.

The digital control devices are provided with an analog/digital converter able to measure the output voltage and/or current of the DC-DC converter. The information deriving from the analog/digital converter is then processed by means of a digital control algorithm. The signal generated by the algorithm is sent to the input of a PWM device the output signal of which is used to drive the power transistor of the DC-DC converter.

However, the digital control devices have a main disadvantage due to the time delay in the control loop needed for processing the information. For this reason the digital control devices that are now present in commerce do not assure that the supply voltage of the load placed downstream of the DC-DC converter is kept constant without going down a voltage level that is equal to the minimum operation value of the load when the same load requires high currents.

A digital control device for a DC-DC converter is disclosed in the article "Modeling and Simulation of new digital control for power conversion systems" Capponi, G.; Livreri, P.; Minieri, M.; Marino, F. Power Electronics Specialists Conference, 2002, pesc 02.2002 EEEE 33rd Annual, Volume 1, 2002 Pages: 155–158. In such article a technology of voltage positioning (VP) is used to minimize the excursion of the output voltage with the load variations. FIG. 3 shows the waveform of the output voltage Vo and of the current Iload in the load LOAD of the generic converter in FIG. 1 by using the control device that is present in said article: the voltage Vo shows peaks of the order of 400 mV with load current variations of the order of 15 A.

SUMMARY

In view of the state of the art described, it is an object of the present invention to provide a digital control apparatus for a switching DC-DC converter that allows to lower further the excursion of the output voltage of the converter with the load variations.

According to present invention, such object is obtained by means of a digital control apparatus for a switching DC-DC converter, said converter comprising at least one power transistor and being able to provide a regulated output voltage on a load, said apparatus comprising control digital means having in input a reference digital signal and being able to provide a modulating signal to a PWM device, said PWM device having in input said modulating signal and providing an output square wave signal for driving the power transistor of said DC-DC converter, characterized by comprising digital means able to operate on the square wave signal to obtain that it has a non-linear modulation only when the value of a signal on the load is lower or higher than prefixed value range of said signal on the load.

BRIEF DESCRIPTION OF THE DRAWINGS

The features and the advantages of the present invention will be made evident by the following detailed description of embodiments thereof, shown as not limiting examples in the annexed drawings, wherein:

FIGS. 6a–6c show time diagrams of the output signals of various circuit blocks present in the scheme in FIG. 4a;

FIG. 7 shows the diagrams of the voltage signal Vout and of the current signal Iload in an oscilloscope for the DC-DC converter in FIG. 4a.

DETAILED DESCRIPTION

Figure 4A:
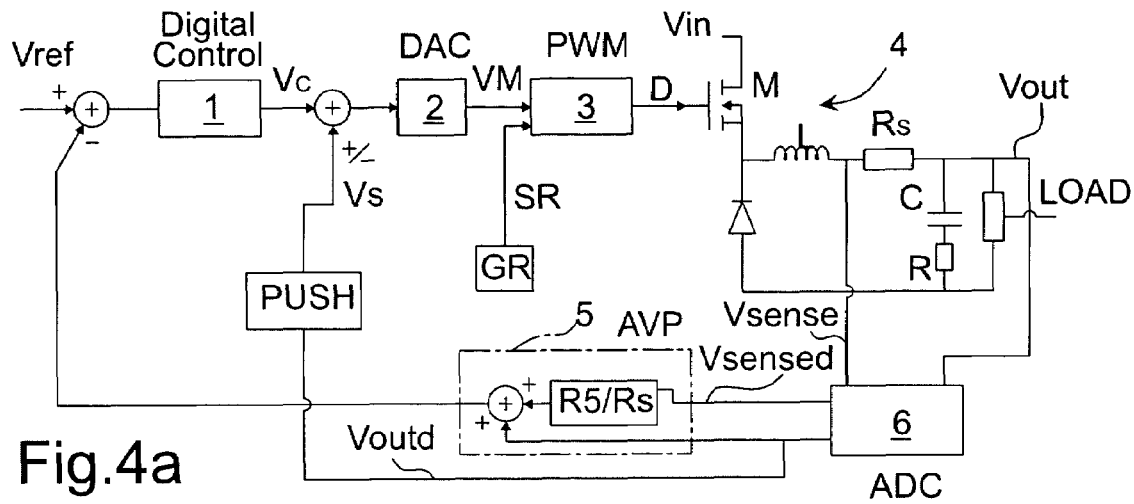
FIG. 4a is a block scheme of a digital control apparatus for a DC-DC converter according to a first embodiment of the present invention.

In FIG. 4a a block scheme of a digital control apparatus for a DC-DC converter according to a first embodiment of the present invention is shown. A digital control block 1 receives an input reference voltage Vref, that is a constant digital signal, and provides an output voltage Vc. The digital control block 1 is preferably performed by means of a PID.

Figure 1:
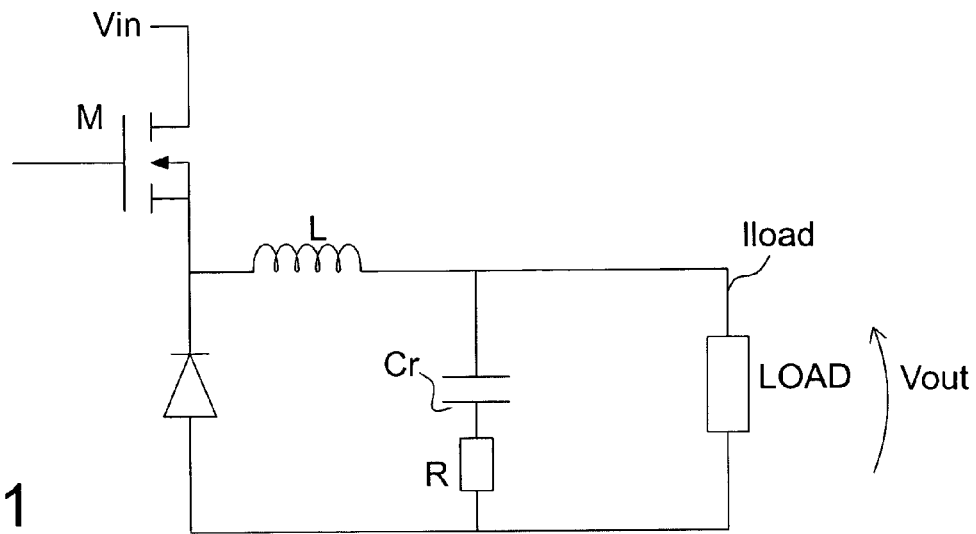
FIG. 1 is a circuit scheme of a DC-DC converter according to prior art.
Figure 2A:
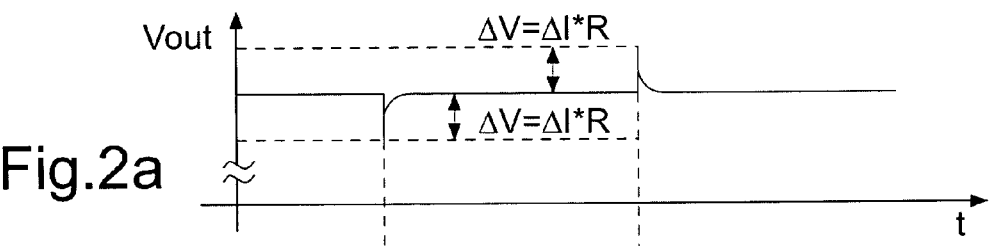
FIGS. 2a and 2b show the voltage and the current in the load of the converter in FIG. 1.
Figure 2B:
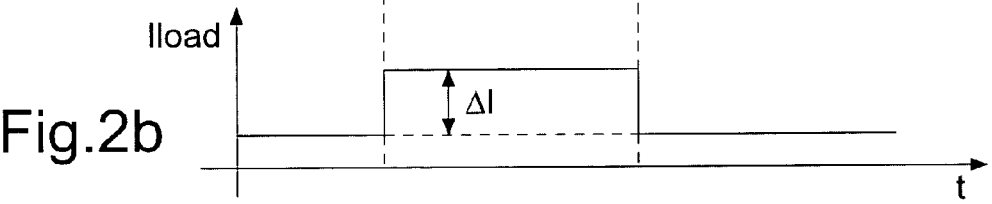

The signal Vc is sent in input to a digital/analog converter 2 providing the correspondent output analog signal. The last signal and a slope signal SR generated by a device GR are in input to an analog PWM device 3 able to provide a signal D to drive the power transistor M belonging to a DC-DC converter 4, for example the converter shown in FIG. 1.

The output signal Vout of the converter 4 is sent in input to a analog/digital converter 6; the digital signal Voutd is sent to a block PUSH able to provide a digital signal Vs that is added to or subtracted from the signal Vc in order to carry out a non-linear modulation of the square wave signal D in output from the PWM device 3. The block PUSH is formed by a series of programmable registers and the signal Vs is of the step ramp type and its duration Dt and its amplitude A are programmable.

Figure 5A:
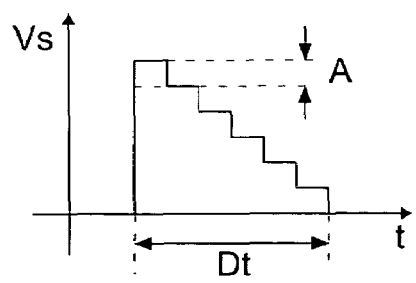
FIGS. 5a and 5b show the possible waveform of the output signal of the block PUSH of the device in FIGS. 4a or 4b.
Figure 5B:
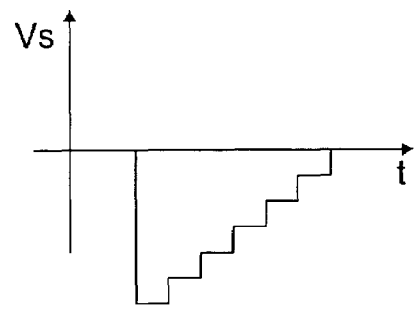

The signal Vs is emitted when the output voltage Vout goes under a lower threshold value or rises over a top threshold value, that is when said voltage Vout is out of a prefixed range of the output voltage Vout, for example if the voltage Vout is higher or lower than the 5% of its stationary value; more precisely the signal Vs is emitted during the transitions of the output voltage Vout or of the current Il flowing through the inductor L which are due to a variation of the load LOAD of the converter 4. Also the effect of such signal must not last for a long time, therefore it is necessary that said effect decreases in a gradual way. For these reasons the signal Vs has a waveform as shown in FIGS. 5a or 5b.

Preferably the output voltage signal Voutd of the converter 6 is sent to an adaptive voltage positioning block (AVP) 5 having in input even a digital signal Vsensed, that is for example the signal Vsense deriving from a sense resistor Rs placed in series with the inductor L of the DC-DC converter which is made digital by the block 6. In the block 5 the digital signal Vsensed is multiplied by the value of the resistor Rs, divided by the value of the resistor R5, which has an equal or different value with respect to the value of the resistor R, and summed to the digital signal Voutd. The resulting signal is in output from the block 5 and is subtracted from the signal Vref and is sent to the block 1.

In FIG. 6a the slope signal SR and an analog signal VM given by the sum or the difference between the modulating signal Vc and the signal Vs are shown. Said sum or difference are due to the positive or negative variations of the output voltage Vout; in fact if the variation of the load LOAD causes an elevation of the voltage Vout a signal Vs as shown in FIG. 5b will be obtained; if instead the variation of the load LOAD causes a decrease of the voltage Vout a signal Vs as shown in FIG. 5a will be obtained. The output signal D of the PWM block 3 is a non-linear modulated square wave signal (FIG. 6b). Said signal D drives the power transistor M of the DC-DC converter by increasing or decreasing the on time Ton that is by modulating the duty-cycle. In such way the increase of the time Ton causes an increase of the current IL flowing through the inductor L (which is represented by a continuous tract with respect to the sketch tract) for satisfying the current requirement from the load LOAD while a decrease of the Ton time allows the inductor L to be easily discharged and to be quickly brought into the new stationary state.

Figure 3:
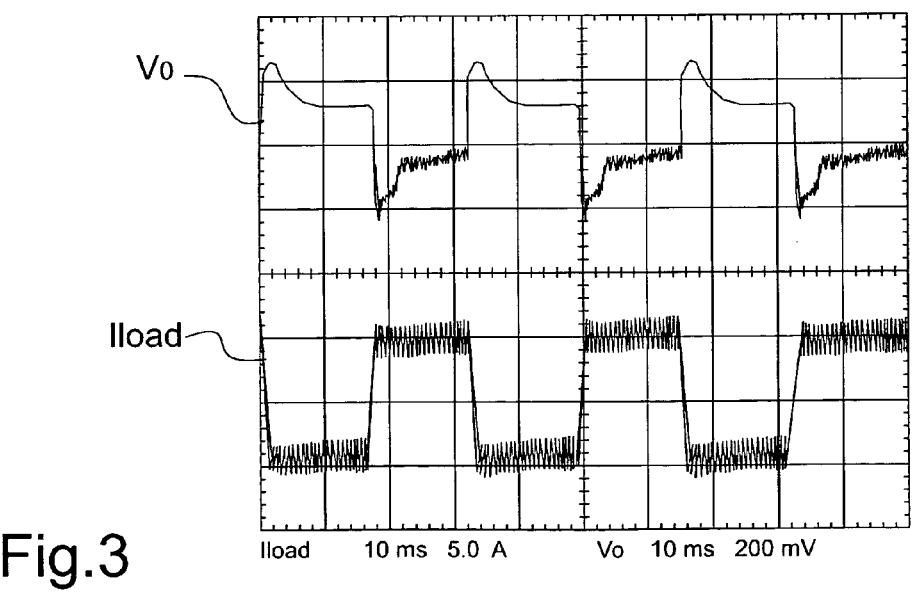
FIG. 3 shows the diagrams of the voltage signal Vo and of the current signal Iload in an oscilloscope for the circuit in FIG. 1 by using a digital control device according to prior art.
Figure 7:
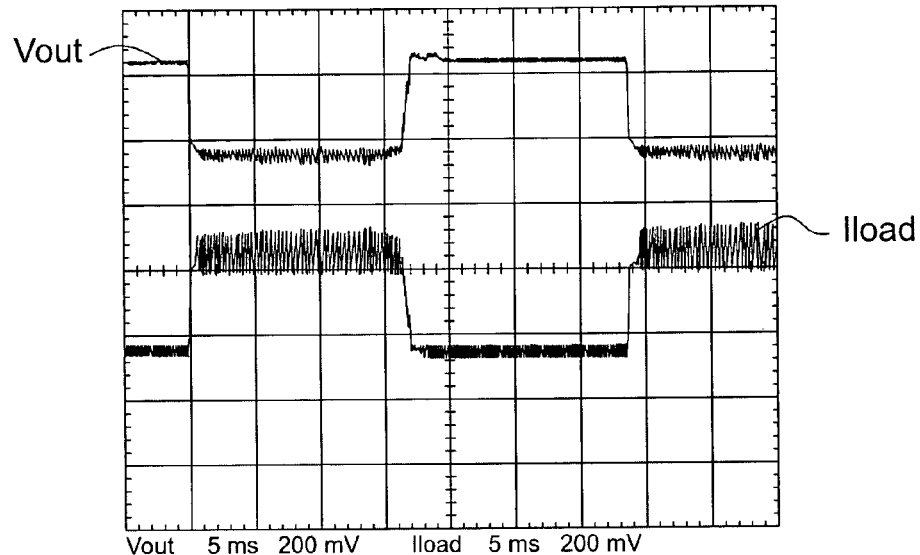

In FIG. 7 the oscilloscope measurements of the voltage signal Vout and of the current signal Iload for the circuit in FIG. 4a are shown; it may be noted that the voltage Vout has a voltage drop of 150 mV in correspondence of load current variations of the order of 15 A and it does not present the voltage peaks of the signal Vo in FIG. 3.

Figure 4B:
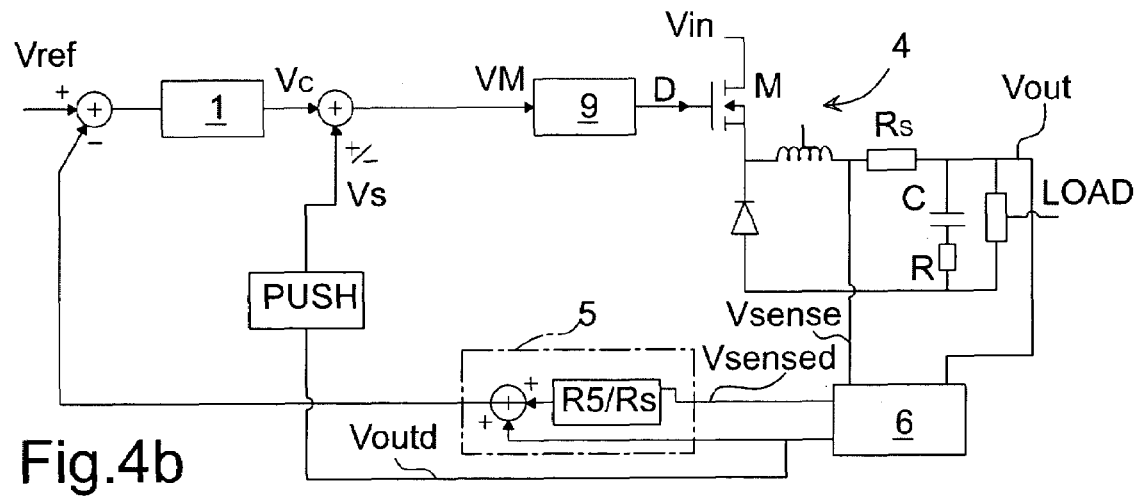
FIG. 4b is a block scheme of a digital control apparatus for a DC-DC converter according to a second embodiment of the present invention.

In FIG. 4b a block scheme of a digital control apparatus for a DC-DC converter according to a second embodiment of the invention is shown. The control apparatus of said second embodiment is different from the control apparatus of the first embodiment for the presence of a digital PWM device 9 instead of the analog PWM device 3. In such a way the digital/analog converter 2 does not occur and the signal to be modulated is of digital type and is generated inside the block 9.

Figure 8:
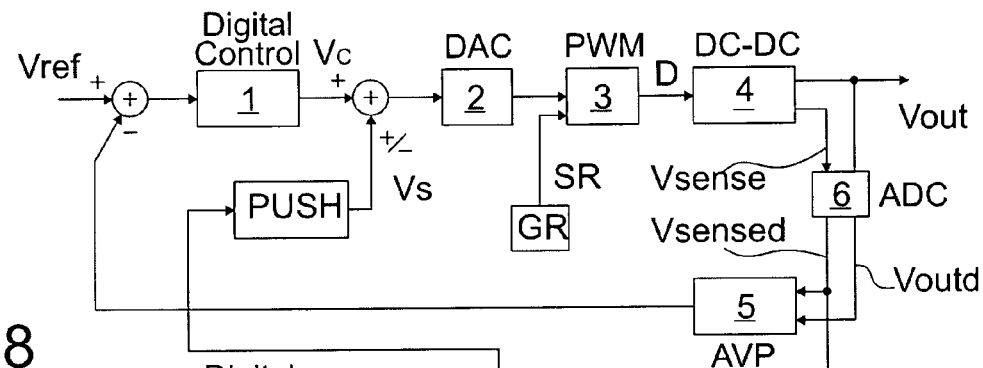
FIGS. 8–10 are block schemes of a digital control apparatus for a DC-DC converter according to variants of the first and the second embodiment of the present invention.
Figure 9:
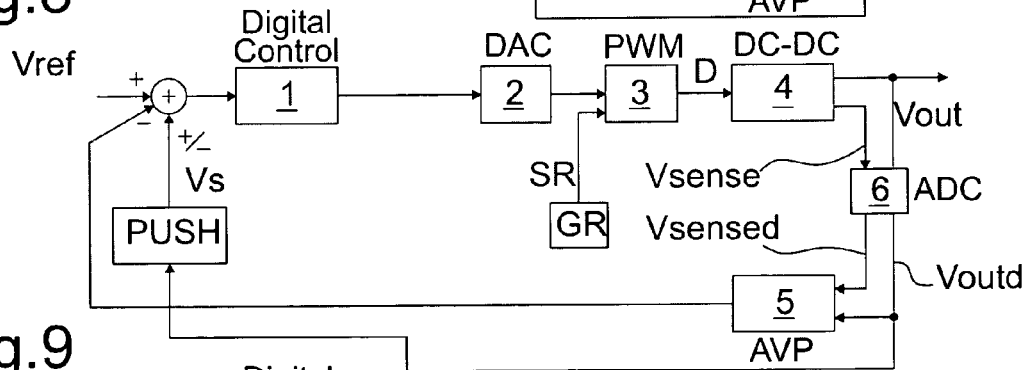
Figure 10:
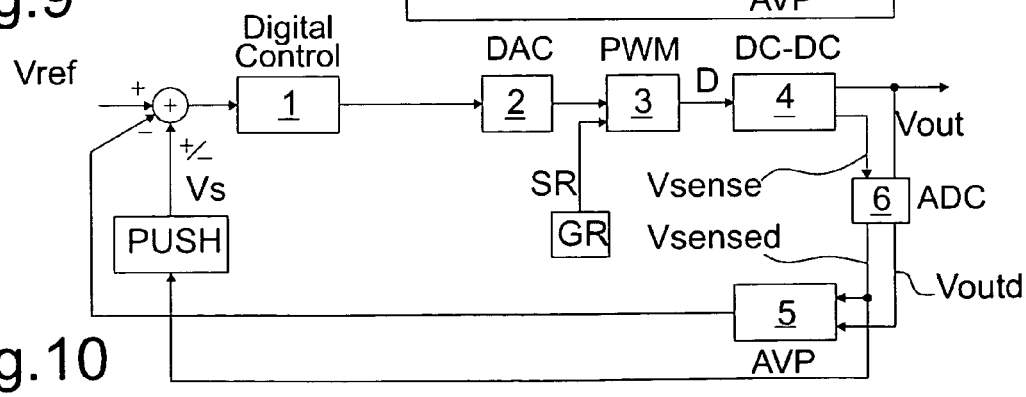

Alternatively, according to variants of the above mentioned embodiments, the signal Vs may be sent in input to the control block 1 (FIG. 9) instead that to the PWM device. According to other variants the block PUSH may be controlled by means of a signal present in the sense resistor Rs, that is the current IL or the voltage Vsense proportional to the current IL, which is always a signal proportional to the current variation of the load LOAD; the output signal Vs of the block PUSH may be sent in input to the PWM device (FIG. 8) or to the control block 1 (FIG. 10). The block PUSH comprises numeric comparators able to compare the output signal Voutd of the converter 6 with said prefixed voltage value range (block PUSH in FIGS. 4 and 9) or able to compare the voltage signal Vsensed proportional to the current signal IL or the current signal IL that has been digitalized respectively with a prefixed voltage value range or with a prefixed current value range (block PUSH in FIGS. 8 and 10), that is for example if the voltage Vsense or the current IL is higher or lower than the 5% of its stationary value. Even if in FIGS. 8–10 only apparatus as variants of the first embodiment of the present invention are shown, the features of the variants in FIGS. 8–10 are valid for the second embodiment of the present invention.

While there have been described above the principles of the present invention in conjunction with specific memory device layout and circuitry, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A digital control apparatus for a switching DC-DC converter including at least one power transistor and being able to provide a regulated output voltage on a load, said apparatus comprising:
   digital control means for receiving a digital reference signal and for providing a modulating signal; and
   a PWM device for receiving said modulating signal and providing a square wave signal for driving the power transistor of said DC-DC converter, wherein said digital means operates on the PWM device to discontinuously modify the value of the duty cycle of the square wave signal only when the value of a signal on the load is lower or higher than a prefixed value range.

2. The apparatus according to claim 1, further comprising means for driving the power transistor including means for determining the on time and the off time of said power transistor.

3. The apparatus according to claim 2, wherein said digital control means comprises means to increase or decrease the on time of said transistor.

4. The apparatus according to claim 3, wherein said means to increase or decrease the on time of said transistor further comprises means to increase or the decrease the value of the signal on the load with respect to a predetermined value range.

5. The apparatus according to claim 1, wherein said digital means further comprises means for providing a step ramp signal.

6. The apparatus according to claim 5, wherein the amplitude and the duration of said step ramp signal are programmable.

7. The apparatus according to claim 1, wherein said signal on the load comprises the output signal of the DC-DC converter.

8. The apparatus according to claim 7, wherein said digital control means comprise numeric comparators able to compare said output signal of the DC-DC converter with a predetermined voltage value range.

9. The apparatus according to claim 1, wherein said signal on the load comprises a current signal.

10. The apparatus according to claim 9, wherein said digital control means comprise numeric comparators able to compare a signal proportional to the current signal on the load with a predetermined signal value range.

11. The apparatus according to claim 1, wherein said PWM device comprises an analog device.

12. The apparatus according to claim 11, further comprising means for generating a ramp signal to the input to said analog PWM device.

13. The apparatus according to claim 1, further comprising a digital-to-analog converter able to convert the digital signals to the input to said PWM device.

14. The apparatus according to claim 1, wherein said PWM device is a digital device.

15. The apparatus according to claim 1, wherein said DC-DC converter comprises at least one inductor having a first terminal connected with a non-drivable terminal of said power transistor and a second terminal connected with a capacitor placed in parallel with the load.

16. The apparatus according to claim 15, further comprising a voltage positioning block having an input for receiving said output voltage and a voltage proportional to the current flowing through the inductor and an output for providing the difference voltage to the input of said control digital means.

17. The apparatus according to claim 16, wherein said voltage difference is subtracted from the reference signal.

18. A digitally controlled DC-DC converter comprising:
   a summer for receiving a reference signal;
   a digital control block coupled to said summer;
   a DAC coupled to said digital control block;
   a PWM circuit coupled to said DAC;
   a DC-DC converter coupled to said PWM circuit, having an output for providing an output signal to a load; and
   feedback means for providing said output signal to said summer, wherein said PWM circuit provides a square wave signal having a discontinuously modified duty cycle value only when the value of a signal on the load is lower or higher than a predetermined value range.

19. The DC-DC converter of claim 18 wherein said feedback means comprises an ADC.

20. The DC-DC converter of claim 18 wherein said feedback means comprises an adaptive voltage positioning block.

* * * * *